US011722603B2

(12) United States Patent
Puttick

(10) Patent No.: US 11,722,603 B2
(45) Date of Patent: *Aug. 8, 2023

(54) VOLUME CONTROL OVER SHARED TRUNK LINES IN INTERCOM SYSTEMS

(71) Applicant: Robert Bosch GmbH, Stuttgart (DE)

(72) Inventor: James Puttick, Scarborough (CA)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,270

(22) Filed: Aug. 3, 2022

(65) Prior Publication Data

US 2022/0377180 A1 Nov. 24, 2022

Related U.S. Application Data

(63) Continuation of application No. 17/071,688, filed on Oct. 15, 2020, now Pat. No. 11,438,461.

(51) Int. Cl.
*H04M 9/00* (2006.01)
*H04M 11/02* (2006.01)
*H04R 27/04* (2006.01)
*H04M 9/02* (2006.01)

(52) U.S. Cl.
CPC ........... *H04M 9/005* (2013.01); *H04M 9/001* (2013.01); *H04M 9/02* (2013.01); *H04M 11/02* (2013.01); *H04R 27/04* (2013.01)

(58) Field of Classification Search
None
See application file for complete search history.

(56) References Cited

U.S. PATENT DOCUMENTS

| 4,188,511 A | 2/1980 | Smith et al. |
| 4,716,585 A | 12/1987 | Tompkins et al. |
| 4,718,080 A * | 1/1988 | Serrano ............... H04W 88/021 455/552.1 |
| 5,483,528 A | 1/1996 | Christensen |

(Continued)

OTHER PUBLICATIONS

RTS, ODIN Intercom, Image, webpage publicly available before Oct. 15, 2020, (1 page).

(Continued)

*Primary Examiner* — Quoc D Tran
(74) *Attorney, Agent, or Firm* — Michael Best & Friedrich LLP

(57) ABSTRACT

Systems and methods for volume control over intercom trunk lines. One example method includes receiving, from a first keypanel coupled to a first intercom, a call request identifying a remote keypanel coupled to a second intercom. The method includes transmitting a trunk request based on the call request and receiving a trunk setup message. The method includes activating a first crosspoint to provide a two-way audio connection between the first and second intercom devices. The method includes applying a trunk gain value to the first crosspoint based on the remote keypanel and transmitting, with an audio gain based on the trunk gain value, an audio stream received from the first keypanel. The method includes receiving, from the second intercom, a gain adjustment value associated with the first keypanel and the remote keypanel and applying an adjusted trunk gain value to the first crosspoint based on the gain adjustment value.

19 Claims, 8 Drawing Sheets

(56) References Cited

U.S. PATENT DOCUMENTS

| | | | |
|---|---|---|---|
| 6,031,902 A | 2/2000 | Takahasi | |
| 6,069,878 A | 5/2000 | Christensen | |
| 7,103,062 B1 | 9/2006 | Erickson et al. | |
| 11,438,461 B2 * | 9/2022 | Puttick | H04M 9/005 |

OTHER PUBLICATIONS

RTS, ADAM Intercom, <https://products.rtsintercoms.com/na/en/adam/>, webpage publicly available before Oct. 15, 2020 (3 pages).
RTS, MCII-E, < https://products.rtsintercoms.com/na/en/mcii-e>, webpage publicly available before Oct. 15, 2020 (2 pages).
RTS, AIO-16, <https://products.rtsintercoms.com/na/en/aio-16/>, webpage publicly available before Oct. 15, 2020 (2 pages).
RTS, KP-5032 Key Panel, Image, webpage publicly available before Oct. 15, 2020, (1 page).
RTS, TM-10K, <https://products.rtsintercoms.com/na/en/tm-10k/>, webpage publicly available before Oct. 15, 2020, (2 pages).
International Search Report for Application No. PCT/EP2021/076638 dated Jan. 20, 2022 (5 pages).
Strader, "A User's Guide to Trunking", RTS, 2001, <https://products.rtsintercoms.com/binary/A%20Users%20Guide%20to%20Trunking.pdf>, pp. 1-8.
BOSCH Security Systems LLC, "KP-5032 and KP-4016 Keypanels Technical Manual", 2020, <https://products.rtsintercoms.com/na/en/kp-series>, 300 pages.
BOSCH Security Systems, Inc, "(F.01U.304.914 Rev. 05) KP-5032 and KP-4016 Keypanels Technical Manual", Rev 05, Jun. 2017, <http://www.pilotefilms.com/uploads/product/telex-rts-matrices-4-fils/kp-5032/documents/19767.pdf>, 306 pages.

* cited by examiner

"VOLUME CONTROL OVER SHARED TRUNK LINES IN INTERCOM SYSTEMS

RELATED APPLICATIONS

The present application is a continuation of U.S. application Ser. No. 17/071,688, filed on Oct. 15, 2020, entitled "Volume Control Over Shared Trunk Lines in Intercom Systems," the disclosure of which is incorporated herein by reference in its entirety and to which priority is claimed.

FIELD

Embodiments described herein relate to intercom systems, intercom devices, and their methods of operation, and, more particularly, to systems and methods for volume control over shared trunk lines.

SUMMARY

Intercom systems, for example, broadcast intercom systems, may include large numbers of audio ports (typically in the range of 100 to 1000 ports). Each port includes an audio input and an audio output. Intelligent devices, such as keypanels, can be connected to each port. Each port can listen to a mix of other sources (ports), at individually-controlled levels.

Trunking allows audio data to be transported between a port in one intercom and a port in a different intercom. As an example, this allows a keypanel user to call a user in a different intercom. The recipient hears the call, and receives a tally (e.g., a flashing key) to indicate who is calling. The recipient can then reply, allowing for a 2-way conversation. This is analogous to a telephone trunk line connecting a telephone user connected to the telephone central office (CO) in one city to a telephone user connected to a CO in another city.

Some broadcast intercoms support "forking," in which multiple independent calls can be carried on the same trunk without interference, as long as all of the calls have one port in common at one end. For example, a keypanel K1 in intercom X may be connected via trunk T1 to keypanel K2 in intercom Y. If a keypanel K3 (also in intercom Y) calls K1, that audio can also be carried on the existing trunk T1. Forking significantly reduces the number of trunks required in a system.

Trunks paths are determined dynamically, based on the available resources. Note that each trunk is a simple bi-directional audio stream, carrying one audio signal (which may be a mix of sources). It is not a multiplexed channel; the audio stream cannot be separated out into its individual components.

Keypanel users often monitor multiple audio streams, or participate in multiple audio conferences over a single keypanel. Accordingly, users want to be able to control the level at which they hear different audio sources. For example, a user may wish to turn down the volume for a source that they need to monitor in the background, while increasing the volume for a more urgent conversation. With fixed tie-lines, individual audio adjustment can be done by adjusting the audio level from the tie-line to the listener. However, with intercom trunking, this does not work. First, the audio adjustment has to be applied dynamically, based on where the audio enters the intercom (i.e., which trunk line is selected). Second, if the trunk uses forking, then a local audio adjustment would apply to all the conversations carried over the trunk, whereas the user may want to adjust just one component of the conversation.

Accordingly, systems and methods are provided herein for remote volume control over intercom system trunk lines. Embodiments described herein allow for, among other things, remote volume adjustments to be applied persistently to trunked audio connections between keypanels. Using such embodiments, users are able to balance the gain for multiple audio streams received over one or more trunk connections by remotely adjusting the gain where the audio is patched into its trunk.

One example embodiment provides an intercom device. The device includes a plurality of audio ports including a first port coupled to a first keypanel and a second port coupled to a trunk line providing a two-way audio connection between the intercom device and a second intercom device, a plurality of crosspoints for interconnecting the plurality of audio ports, a communication interface, and an electronic processor coupled to the plurality of crosspoints and the communication interface. The electronic processor is configured to receive, from the first keypanel, a call request identifying a remote keypanel coupled to the second intercom. The electronic processor is configured to transmit, to a trunk controller via the communication interface, a trunk request based on the call request. The electronic processor is configured to receive, from the trunk controller via the communication interface, a trunk setup message. The electronic processor is configured to activate a first crosspoint of the plurality of crosspoints based on the trunk setup message, the first crosspoint associated with the first port and the second port. The electronic processor is configured to apply a trunk gain value to the first crosspoint based on the remote keypanel.

Another example embodiment provides a method for remote gain adjustment. The method includes receiving, from a first keypanel coupled to a first intercom, a call request identifying a remote keypanel coupled to a second intercom. The method includes transmitting, to a trunk controller, a trunk request based on the call request. The method includes receiving, from the trunk controller, a trunk setup message. The method includes activating a first crosspoint of a plurality of crosspoints based on the trunk setup message, the first crosspoint coupled to a first port associated with a first keypanel and a second port coupled to a trunk line providing a two-way audio connection between the first intercom device and the second intercom device. The method includes applying a trunk gain value to the first crosspoint based on the remote keypanel. The method includes transmitting, with an audio gain based on the trunk gain value, an audio stream received from the first keypanel to the second intercom via the second port. The method includes receiving, from the second intercom, a gain adjustment value associated with the first keypanel and the remote keypanel. The method includes applying an adjusted trunk gain value to the first crosspoint based on the gain adjustment value.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
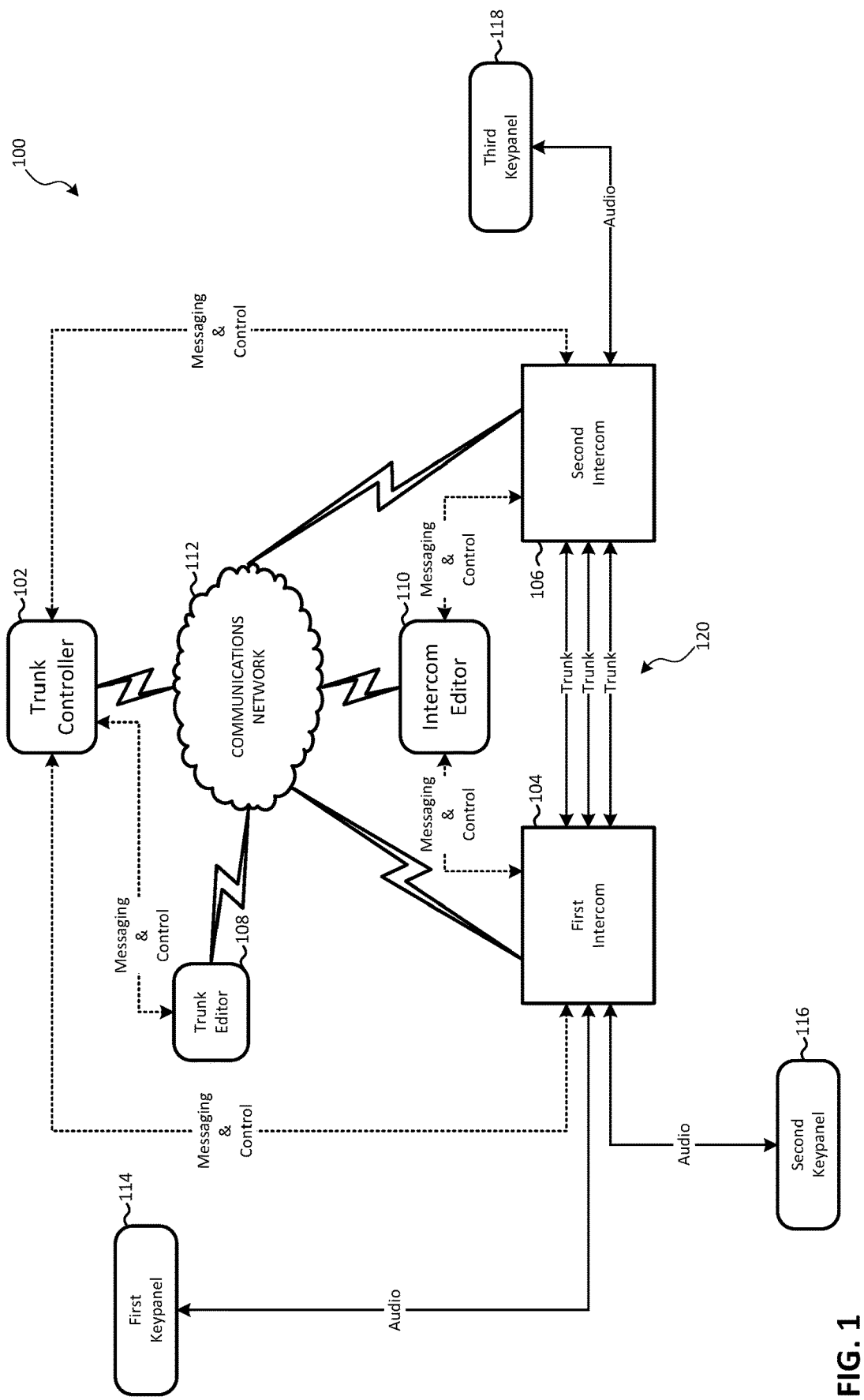
FIG. 1 is a block diagram of an intercom system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments are explained in detail, it is to be understood that the invention is not limited in its application to the details of construction and the arrangement of components set forth in the following description or illustrated in the following drawings. Other embodiments are possible, and embodiments and examples provide are capable of being practiced or of being carried out in various ways.

For ease of description, each of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of an example intercom system 100. FIG. 1 shows one example of a networked configuration, in which embodiments may be implemented; other configurations are possible. In the example shown, the system 100 includes a trunk controller 102, a first intercom 104, a second intercom 106, a trunk editor 108, and an intercom editor 110. The trunk controller 102, the first intercom 104, the second intercom 106, the trunk editor 108, and the intercom editor 110 are communicatively coupled to one another via a communications network 112. The communications network 112 is a communications network including wireless connections, wired connections, or combinations of both. The communications network 112 may be implemented using a local area network, for example, a Bluetooth™ network or a Wi-Fi network, a wide area network, for example, the Internet, and combinations or derivatives thereof. As would be understood by one skilled in the art, FIG. 1 is a simplified diagram and networks are more complex than the schematic elements depicted in FIG. 1.

The system 100 also includes a first keypanel 114, a second keypanel 116, and a third keypanel 118. In some embodiments, one or more of the first keypanel 114, the second keypanel 116, and the third keypanel 118 may be communicatively coupled to other components of the system 100 via the communications network 112. It should be understood that the system 100 is provided as one example and, in some embodiments, the system 100 may include fewer or additional components. In particular, it should be understood that although FIG. 1, for ease of description, illustrates only two intercoms and three keypanels, embodiments of the system 100 may include tens, hundreds, or thousands of intercoms and keypanels interconnected in various ways.

Figure 3:
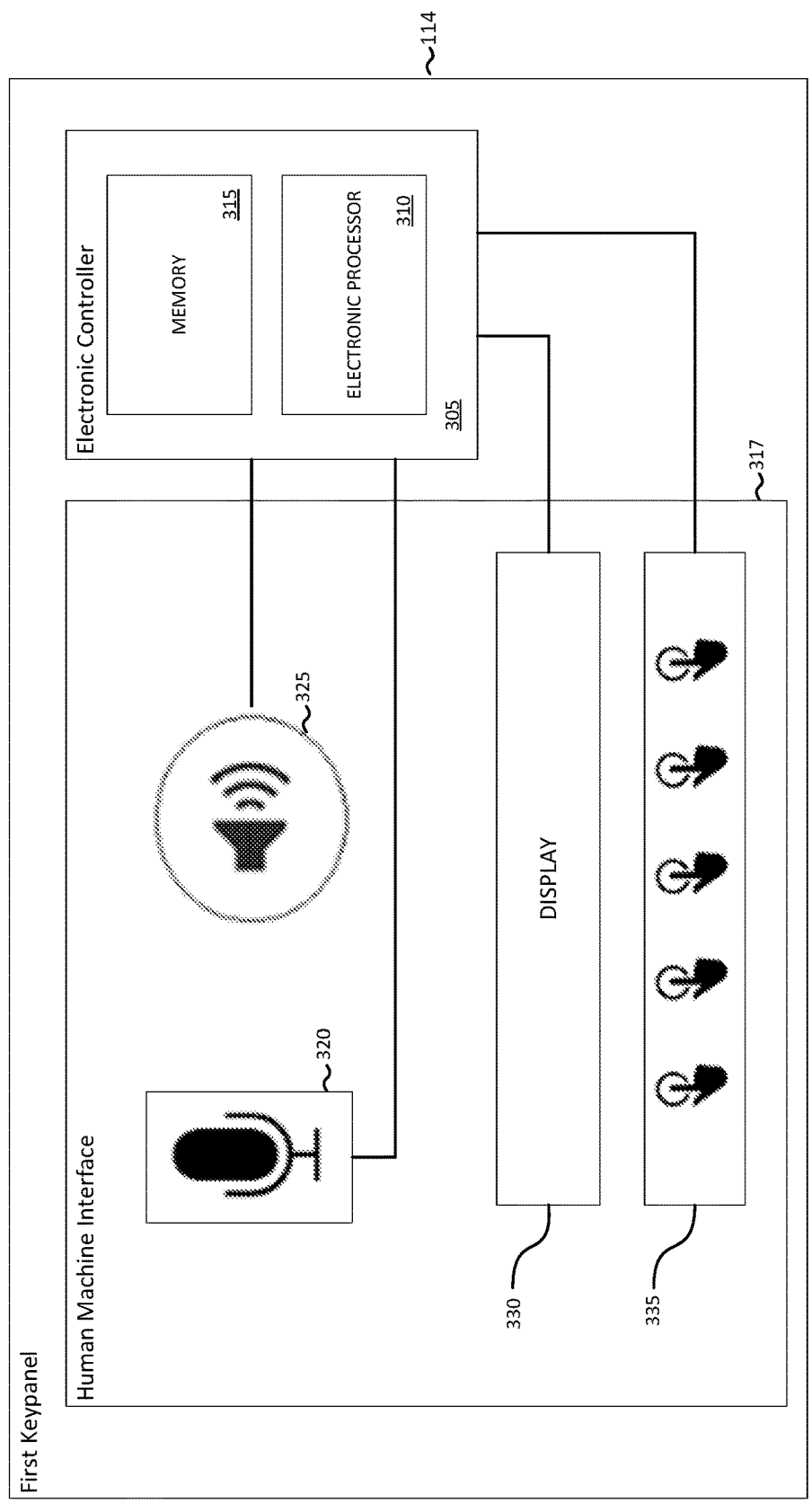
FIG. 3 schematically illustrates a keypanel of the system of FIG. 1, in accordance with some embodiments.

Each of the first keypanel 114, the second keypanel 116, and the third keypanel 118, described in detail herein with respect to FIG. 3, provide a user with two-way audio communications to one or more other users and one-way audio monitoring of one or more audio sources. For example, the director in a news studio may use the first keypanel 114 to communicate with a camera operator, who is using the second keypanel 116. As described herein, each keypanel has a speaker (which plays the audio coming from the intercom to which the keypanel is connected) and a microphone (which sends audio to the same intercom). The keypanel has various keys, which can be used to talk and listen to other users.

To send and receive audio and control signals, a keypanel is connected to a port on an intercom. For example, as illustrated in FIG. 1, the first keypanel 114 and the second keypanel 116 are communicatively coupled to ports of the first intercom 104 and the third keypanel 118 is communicatively coupled to a port of the second intercom 106. Intercoms, for example, the first intercom 104 (described in detail with respect to FIG. 4) include multiple ports for sending and receiving audio and/or control signals. As described herein, audio is routed through an intercom system by interconnecting ports within an intercom at crosspoints. In each of the first intercom 104 and the second intercom 106, one or more ports are audio-only (i.e., there is no keypanel attached). Such ports may be used to bring audio into and out of the intercom (e.g., an audio feed coming from an audio mixing console or an audio feed to a stage announce speaker).

In some embodiments, each of the first intercom 104 and the second intercom 106 may be one of the ADAM®, ADAM-M®, or ODIN® intercoms produced by RTS Intercom Systems®. The first intercom 104 and the second intercom 106 and configured using the intercom editor 110. In some embodiments, the intercom editor 110 executes AZedit® software product produced by RTS Intercom Systems® to configure, control, and monitor the operations of the intercoms and keypanels, in particular, crosspoints and remote volume settings.

As illustrated in FIG. 1, the first keypanel 114 and the second keypanel 116 are connected to ports on the first intercom 104, and the third keypanel 118 is connected to a port on the second intercom 106. As described herein, the trunk controller 102, the first intercom 104, and the second intercom 106 operate to provide audio communications between the first keypanel 114, the second keypanel 116, and the third keypanel 118. For example, as described in detail with respect to FIG. 4, the first intercom 104 may establish audio communications between a user of the first keypanel 114 and a user of the second keypanel 116, by connecting their respective ports within the first intercom 104.

To increase an intercom system's capability, multiple intercoms may be tied together via trunking. Trunking allows a user in one intercom to access resources in another intercom (e.g., to call a keypanel that is connected to a different intercom). For example, as described in detail with respect to FIG. 5, the first keypanel 114, the second keypanel 116, or both, may send and receive audio communications to the third keypanel 118 via the first intercom 104, the second intercom 106, and one or more of a plurality of interconnecting trunks 120. A trunk is an audio-only connection from one port in one intercom to another port in a different intercom. Calls from the first intercom 104 to the second intercom 106 (i.e., trunked calls) are managed by the trunk controller 102.

Figure 2:
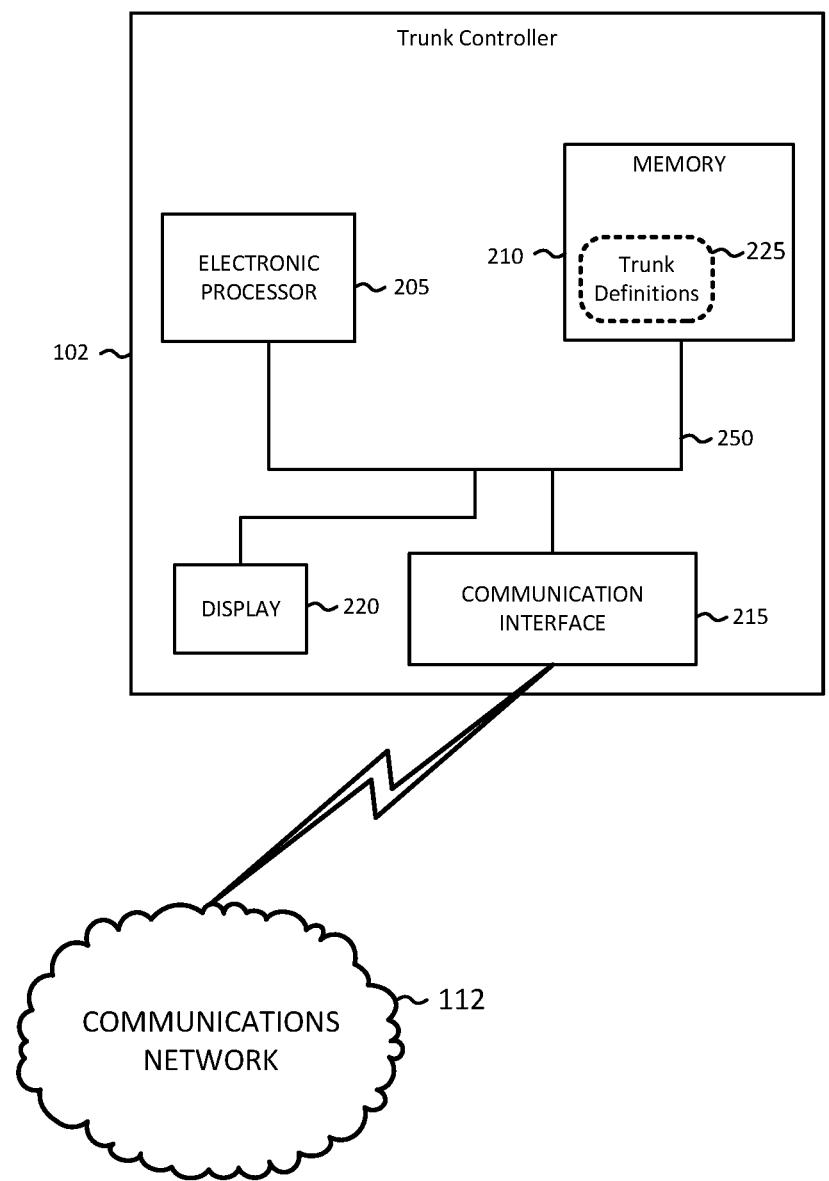
FIG. 2 schematically illustrates a trunk controller of the system of FIG. 1, in accordance with some embodiments.

The trunk controller 102, described in detail herein with respect to FIG. 2, operates to configure and select connections between the first intercom 104 and the second intercom 106. Trunks are predefined (e.g., using the trunk editor 108). The trunk controller 102 is aware of trunks and what they connect. When a call is placed from one intercom to a user in another intercom, the trunk controller 102 decides which predefined trunk to use, and that trunk is then used to pass the audio between the local and the remote users (i.e., their respective keypanels). As described in detail herein, the trunk controller 102 can also send control messages (e.g., using a suitable communications protocol) to the first intercom 104 and the second intercom 106 to adjust gain settings for crosspoints within the intercoms. In some embodiments, the trunk editor 108 executes Trunk Edit® and Trunk Supervisor® software products produced by RTS Intercom Systems® to configure, control, and monitor the operations of the trunk controller 102, in particular, the setup and use of trunks between intercoms and keypanels.

FIG. 2 illustrates an example embodiment of the trunk controller 102 in more detail. In the example provided, the trunk controller 102 includes an electronic processor 205, a memory 210, a communication interface 215, and a display 220. The illustrated components, along with other various modules and components (not shown) are coupled to one another by or through one or more control or data buses (e.g., a communication bus 250) that enable communication therebetween. The use of control and data buses for the interconnection between and exchange of information among the various modules and components would be apparent to a person skilled in the art in view of the description provided herein. In some embodiments, the trunk controller 102 is a network attached computer server. FIG. 2 illustrates only one example embodiment of the trunk controller 102. The trunk controller 102 may include fewer or additional components and may perform functions other than those explicitly described herein. In some embodiments, the trunk controller 102 is one of the Trunk Master® family of products (e.g., a model TM-10K®) produced by RTS Intercom Systems®.

The electronic processor 205 obtains and provides information (e.g., from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, trunk definitions 225 (described in detail herein).

The communication interface 215 is configured to receive input and to provide system output. The communication interface 215 obtains information and signals from, and provides information and signals to, (e.g., over one or more wired and/or wireless connections) devices both internal and external to the trunk controller 102. The communication interface 215 may include a wireless transmitter or transceiver for wirelessly communicating over the communications network 112. Alternatively or in addition to a wireless transmitter or transceiver, the communication interface 215 may include a port for receiving a cable, such as an Ethernet cable, for communicating over the communications network 112 or a dedicated wired connection. It should be understood that, in some embodiments, the trunk controller 102 communicates with other devices through one or more intermediary devices, such as routers, gateways, relays, and the like.

The display 220 is a suitable display such as, for example, a liquid crystal display (LCD) touch screen, or an organic light-emitting diode (OLED) touch screen. In some embodiments, the trunk controller 102 implements a graphical user interface (GUI) (e.g., generated by the electronic processor 205, from instructions and data stored in the memory 210, and presented on the display 220), that enables a user to interact with the trunk controller 102. In some embodiments, the trunk controller 102 enables display remotely, for example, using a display of the trunk editor 108 or a display of another remote computer terminal (not shown) via one or more intervening networks.

In some embodiments, the trunk editor 108 and the intercom editor 110 are or include computer servers, which include similar components and overall are constructed and configured similarly to the trunk controller 102.

FIG. 3 illustrates one example construction of the first keypanel 114. In the example illustrated, the first keypanel 114 includes a plurality of electrical and electronic components that provide power, operational control, and protection to the components and modules within the first keypanel 114. The first keypanel 114 includes an electronic controller 305, which further includes an electronic processor 310 (e.g., a programmable electronic microprocessor, microcontroller, or similar device) and a memory 315 (e.g., non-transitory, machine-readable memory). The electronic processor 310 is communicatively coupled to the memory 315 and executes instructions stored on the memory 315. The electronic processor 310 is configured to retrieve from memory 315 and execute, among other things, instructions related to the control processes and methods described herein. In other embodiments, the first keypanel 114 may include fewer or additional components and may perform functions other than those explicitly described herein. In some embodiments, the first keypanel 114 is one of the KP-Series® family of intercom keypanels (e.g., a model KP-5032®) produced by RTS Intercom Systems®.

In the illustrated embodiment, the first keypanel 114 also includes a human machine interface 317. The human machine interface 317 includes a microphone 320, a speaker 325, a display 330, and an input mechanism 335. The microphone 320 and the speaker 325 may be constructed in various configurations. For example, the speaker 325 and the microphone 320 may be integrated into a single headset or may be separate stand-alone components. The speaker 325, the microphone 320, the display 330, and the input mechanism 335 are electrically coupled with the controller 305 and provide input and output functionality for a user of the first keypanel 114. In some embodiments, the first keypanel 114 generates an audio stream (e.g., a voice message) from the microphone 320. In other embodiments, an audio stream may be generated by other sources and received by the first keypanel 114. An audio stream may also be stored in the memory 315. User-selectable entries from the input mechanism 335 selects and directs transmission and reception of audio streams for the first keypanel 114 as described below.

The input mechanism 335 may have multiple inputs including multiple buttons, switches, toggles, and the like. Each of these inputs may activate communication with one or more particular intercom devices. When one of the inputs of the input mechanism 335 is activated (e.g., by depressing, toggling, holding, and the like), the controller 305 selects a particular intercom device selected by the activated input for communication, and may send addressing information associated with the selected intercom device to the first intercom 104. The first intercom 104 may then activate a communication link between the first keypanel 114 and the selected intercom device. The first keypanel 114 may be preconfigured with an address of each particular intercom device that is associated with each particular input.

In some embodiments, the second keypanel 116 and the third keypanel 118 include similar components and overall are constructed and configured similarly to the first keypanel 114. In some embodiments, the second keypanel 116, the third keypanel 118, or both are substantially identical to the first keypanel 114.

Figure 4:
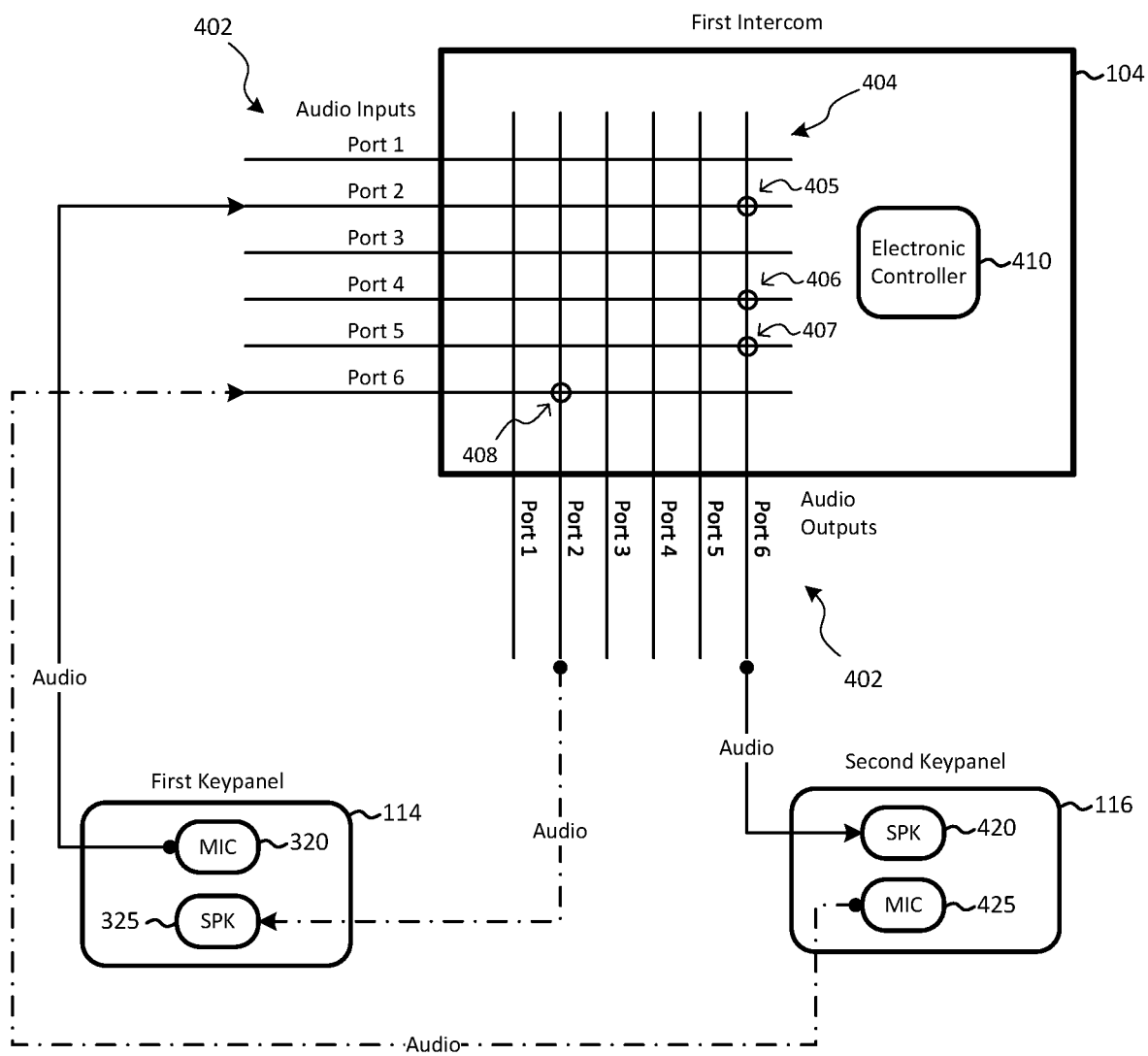
FIG. 4 illustrates aspects of the operation of the system of FIG. 1, in accordance with some embodiments.

As noted, the first intercom 104 is configured to provide audio communications between the first keypanel 114 and the second keypanel 116. As illustrated in FIG. 4, the first intercom 104 includes a plurality of audio ports 402 (each including an input and an output). The audio ports 402 are configured to create a switching fabric 404. The switching fabric 404 may be implemented physically (e.g., using solid state circuitry) or digitally. Regardless of its construction, the switching fabric 404 provides crosspoints (including crosspoints 405-408) for interconnecting audio inputs and outputs to provide, among other things, audio connections between keypanels. The first intercom 104 includes an electronic controller 410 (e.g., including at least an electronic processor, a memory, and a communication interface) to control the switching fabric 404 to activate and deactivate the crosspoints. For example, the electronic controller 410 connects the audio input of port 2 to the audio output of port 6 at crosspoint 405 and the audio input of port 6 to the audio output of port 2 at crosspoint 408 to provide a connection between the first keypanel 114 and the second keypanel 116. In this way, audio originating with the microphone 425 of the second keypanel 116 is routed to the speaker 320 of the first keypanel 114. Likewise, audio originating with the microphone 325 of the first keypanel 114 is routed to the speaker 420 of the second keypanel 116. The electronic controller 410, controls the gain for each crosspoint. The default gain for each crosspoint is 0 dB.

A keypanel may listen to a mix of different audio inputs, similar to an audio mixing console. For example, as illustrated in FIG. 4, the second keypanel 116, in addition to receiving audio from the first keypanel 114, also receives audio from input ports 4 and 5, which are patched into output port 6 at crosspoints 406 and 407, respectively. Output port 6 therefore carries a mix of three audio signals to the speaker 420 of the second keypanel 116. Because each crosspoint has its own gain, the user of the second keypanel 116 can adjust (e.g., using the input mechanism 335) the relative loudness of the inputs.

Figure 5:
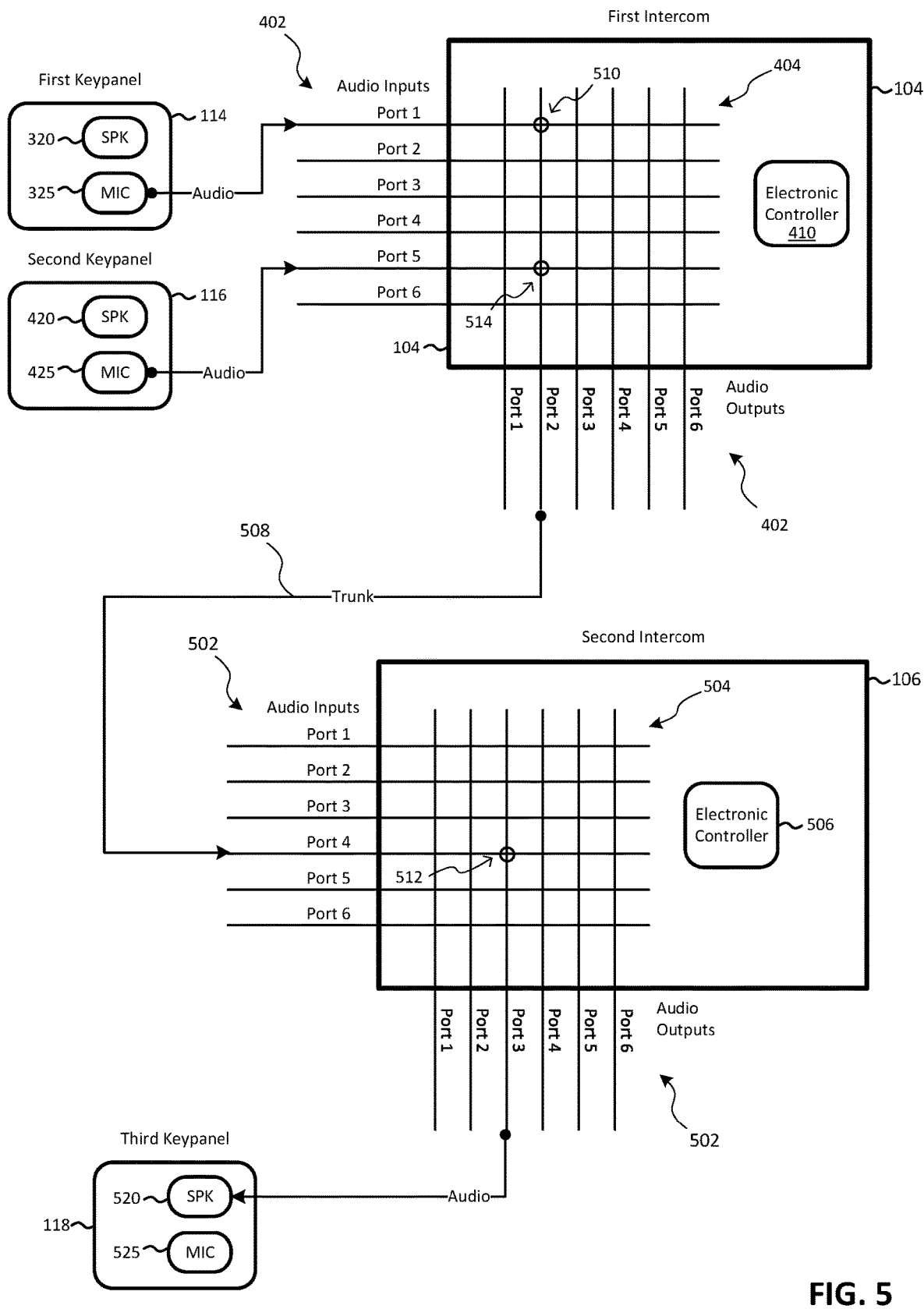
FIG. 5 illustrates aspects of the operation of the system of FIG. 1, in accordance with some embodiments.

FIG. 4 illustrates two keypanels in communication via a single intercom. However, as noted, some intercom systems utilize trunking to provide audio connections across multiple intercoms. For example, as illustrated in FIG. 5, the first keypanel 114, the second keypanel 116, and the third keypanel 118 communicate via the first intercom 104 and the second intercom 106. The second intercom 106 is configured similarly to the first intercom 104, and includes a plurality of audio ports 502, configured to create a switching fabric 504, which is controlled by the electronic controller 506. The first intercom 104 is connected to the second intercom 106 via a trunk 508 (one of the plurality of interconnecting trunks 120). The trunk may be a physical connection (e.g., a wired connection) or a virtual connection (e.g., using an internet protocol connection).

When a user of the first keypanel 114 inputs a request to call a user of the third keypanel 118, the electronic controller 410 sends a request to the trunk controller 102 to establish the connections. In response, the trunk controller 102 sends messages to the first intercom 104 and the second intercom 106 to set up the audio via the trunk 508, and to give the second keypanel 116 an indication that there is an incoming call from the first keypanel 114. In response to receiving the messages, the electronic controller 410 of the first intercom 104 activates crosspoint 510 to patch input port 1 to output port 2 (the trunk port) and the electronic processor 506 of the second intercom 106 activates crosspoint 512 to patch input port 4 (the trunk port) to output port 3. In this way, audio inputs received from the microphone 325 of the first keypanel 114 are routed to the speaker 520 of the third keypanel 118. Although, for ease of description, only one-way audio connections are show, it should be noted that the audio connections may be bi-directional.

In some instances, more than one keypanel may wish to connect to a remote keypanel on another intercom. In such instances, the trunk controller 102 will utilize forking to connect multiple users via a single trunk, thereby reducing the number of required trunks in a system. For example, as illustrated in FIG. 5, if the second keypanel 116 requests a call to the third keypanel 118, the trunk controller 102 will instruct the first intercom 104 and the second intercom 106 to establish that connection via the existing trunk 508. In response, the electronic controller 410 of the first intercom 104 will activate the crosspoint 514 to patch input port 5 to output port 2 (the trunk port). When this is completed, the speaker 520 of the third keypanel 118 will now receive audio from the microphone 325 of the first keypanel 114 mixed with audio from the microphone 425 of the second keypanel 116, over the trunk 508.

Figure 6:
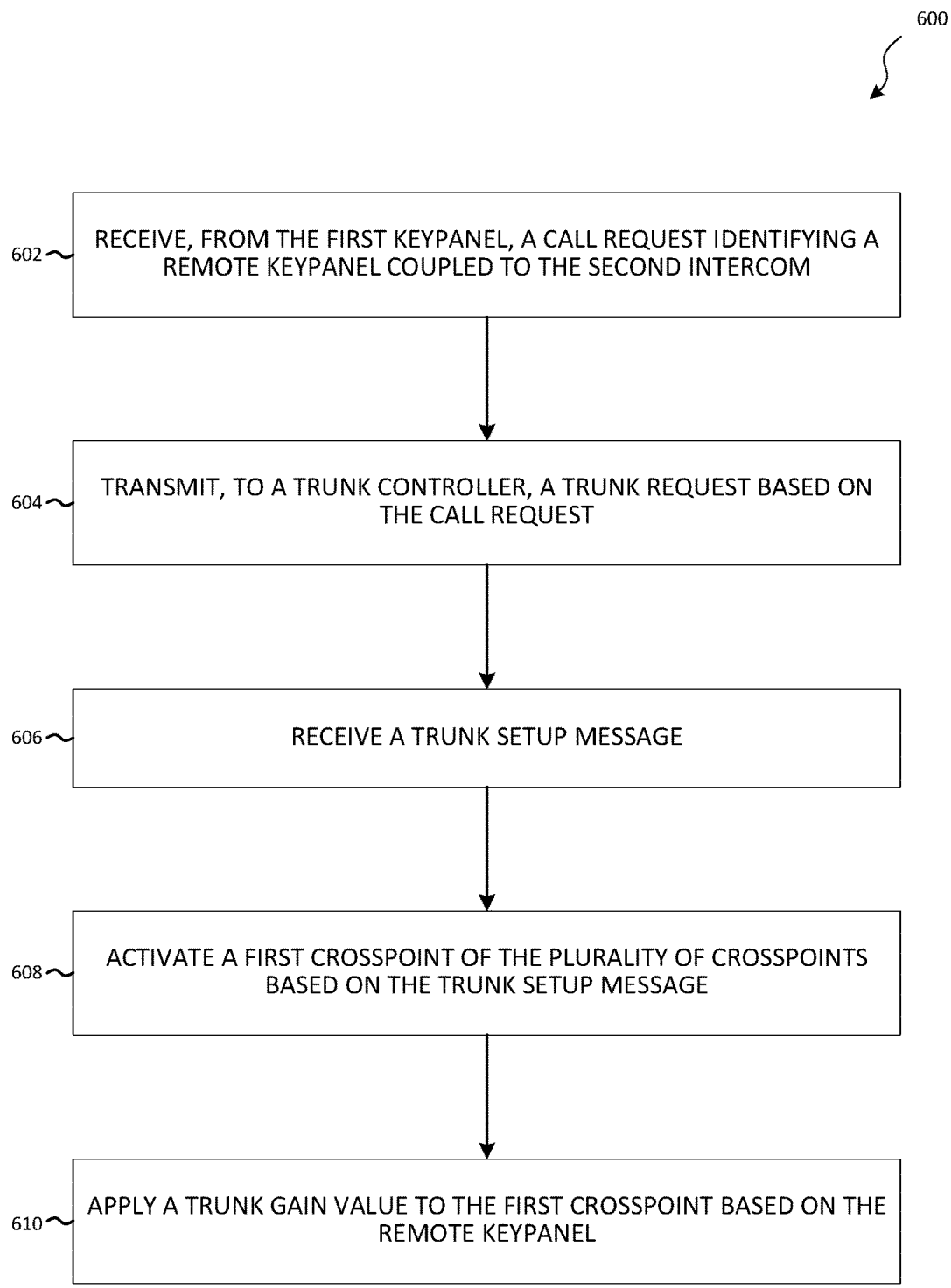
FIG. 6 is a flow chart of a method for volume control over shared trunked lines, in accordance with some embodiments.

In some configurations, a keypanel may receive one or more remote audio sources on a trunk line (e.g., as described herein with respect to FIG. 5). Because adjusting the gain in the local intercom for the trunk line adjusts the gain for all audio sourced received on the trunk line, it is not possible to balance the volume for the mixed audio signals. Therefore, the gain for the individual audio sources must be adjusted at their respective input crosspoints. Accordingly, FIG. 6 illustrates an example method 600 for remote volume control over shared trunk lines. Although the method 600 is described in conjunction with the system 100 as described herein, the method 600 could be used with other systems and devices. In addition, the method 600 may be modified or performed differently than the specific example provided.

As an example, the method 600 is described as being performed by the first intercom 104 and, in particular, the electronic controller 410. However, it should be understood that in some embodiments, portions of the method 600 may be performed by other devices, including for example, the second intercom 106 and the trunk controller 102. Additional electronic controllers may also be included in the first intercom 104 that perform all or a portion of the method 600. For ease of description, the method 600 is described in terms of three keypanels and two intercoms connected by a single trunk line. However, the method 600 may be applied to systems including three or more intercoms, four or more keypanels, two or more trunk lines, and combinations thereof.

At block 602, the first intercom 104 receives, from the first keypanel 114, a call request identifying a remote keypanel coupled to the second intercom. For example, a user of the first keypanel 114 may activate a toggle switch of the input mechanism 335 to place a call to the third keypanel 118. This input generates a call request control signal to the first intercom 104. The call request identifies, among other things, the remote keypanel.

When the first intercom 104 receives a call request, it sets up a connection (e.g., activating a crosspoint) between the calling keypanel and the called keypanel. The first intercom 104 stores (e.g., in a memory of the electronic controller 410) locations for the keypanels in the intercom system 100. When a call request is received for a keypanel connected to another intercom, the first intercom 104 must first establish a connection to the other intercom before connecting the calling keypanel. At block 604, in response to receiving the call request from the first keypanel 114 requesting a connection to a remote keypanel, the first intercom 104 transmits (e.g., via the communication interface) a trunk request based on the call request to the trunk controller 102 (e.g., using a suitable electronic communications protocol). The call request may include information about the call, for example, an identifier for the first keypanel, an identifier for the remote keypanel, an identifier for the second intercom 106, and the like.

The trunk controller 102 receives the call request, and selects (e.g., from a table containing the trunk definitions 225 stored in the memory 210) one or more trunks and/or intervening intercoms that can establish a trunk connection between the first intercom 104 and the intercom to which the remote keypanel is connected (in this example, the second intercom 106). The trunk controller 102 generates trunk setup messages that include the information needed by the intercoms to setup the trunk and transmits the trunk messages to their respective intercoms.

At block 606, the first intercom 104 receives, from the trunk controller (e.g., via the communication interface), the trunk setup message. For example, the trunk message may indicate that the first intercom 104 should connect the first port coupled to the first keypanel 114 to a second port coupled to a trunk line (e.g., connecting input port 1 to output port 2 as illustrated in FIG. 5).

As noted, the ports of an intercom are arranged such that any port may be patched to any other port or ports. At block 608, the first intercom 104 activates a first crosspoint (e.g., crosspoint 510 in FIG. 5) based on the trunk setup message. The first crosspoint is associated with the first port and the second port, and activating it (e.g., by actuating an electronic relay, triggering a solid-state switch, or effecting a digital connection) patches the ports so that audio signals can flow between them. Similarly, the second intercom 106 receives a trunk setup message indicating that the second intercom 106 should connect the port coupled to the third keypanel 118 to another port coupled to the same trunk line (e.g., connecting input port 4 to output port 3 as illustrated in FIG. 5). When both intercoms patch the trunk line to their respective keypanels a trunk is established between the two keypanels. In some embodiments, the first intercom 104, the second intercom 106, the trunk controller 102, or a combination of the foregoing, will start a trunk timer and monitor the signals traversing the trunk. In such embodiments, when the trunk remains inactive for a time period defined by the trunk timer, the trunk is disconnected, freeing the trunk line for use by other users.

As noted, audio gains (volume levels) are applied at the crosspoints. By default, the crosspoint gains are set to 0 dB so that any signals received at a crosspoint are passed through at their existing gain level. To allow the remote keypanel user to regulate the relative volume of mixed audio signals received at the remote keypanel, a trunk gain value is applied.

At block 610, the first intercom 104 applies a trunk gain value to the first crosspoint based on the remote keypanel. In some embodiments, in response to receiving a request to connect the remote keypanel via a trunk, the first intercom 104 retrieves a trunk gain value (e.g., from the memory of the electronic controller 410) based on the first keypanel and the remote keypanel. For example, the memory of the electronic controller 410 may store a trunk gain value to be applied whenever the first keypanel 114 is patched to the remote keypanel (e.g., the third keypanel 118). In some embodiments, the first intercom 104 applies the trunk gain value to the first crosspoint based on the trunk setup message. For example, the trunk setup message may include a trunk gain value to be applied when a trunk is established to link the first keypanel and the remote keypanel.

When an audio stream is received by the first intercom 104 from the first keypanel 114, the first intercom 104 transmits the audio stream to the second intercom via the second port coupled to the trunk with an audio gain based on the trunk gain value. For example, if the trunk gain value is −3 dB, then the gain for the received audio stream is adjusted by −3 dB at the crosspoint before the audio stream is transmitted over the trunk. In this way, the remote keypanel will receive the audio stream at the crosspoint gain level, even if the audio stream is mixed with other audio streams for transmission over the trunk.

Using the method 600, users of remote keypanels (e.g., a user of the third keypanel 118) are able to adjust the volumes of signals received from remote sources over trunks. In one example embodiment, the first intercom 104 receives, from the second intercom 106, a gain adjustment value associated with the first keypanel and the remote keypanel. For example, a user of the remote keypanel may activate the input mechanism of the remote keypanel to adjust the volume of the call from the first keypanel by +1 dB.

When the first intercom 104 received the gain adjustment value, it applies an adjusted trunk gain value to the first crosspoint based on the gain adjustment value. In this example, the adjusted trunk gain value is generated by adding 1 dB to the trunk gain value for the first crosspoint. The first intercom 104 transmits the audio stream with an audio gain based on the adjusted trunk gain value. To preserve the gain setting for future connections of the same keypanels, the first intercom 104 stores (e.g., in a memory of the electronic controller 410), the adjusted trunk gain value, an identifier associated with the first keypanel, and an identifier associated with the remote keypanel. In some embodiments, the first intercom 104 transmits this information to the trunk controller 102 for storage.

As noted, in some embodiments, a trunk timer is used. In such embodiments, responsive to activating the first crosspoint, the first intercom 104 begins a trunk timer and monitors the trunk audio. When the trunk timer expires without receiving an audio input from the first keypanel or the remote keypanel, the first intercom 104 deactivates the first crosspoint, tearing down the trunk. In some embodiments, when the trunk is re-established for the same two keypanels, the previously adjusted volume is applied to the trunk. In such embodiments, the first intercom 104 receives, from the first keypanel, a second call request identifying the remote keypanel. The second call request is substantially similar to the call request described above. In response, the first intercom 104 transmits to the trunk controller a second trunk request based on the second call request. The first intercom 104 receives, from the trunk controller, a second trunk setup message and activates the first crosspoint based on the second trunk setup message, as described above with respect to the first trunk setup message. The first intercom retrieves the adjusted trunk gain value (e.g., from the memory of the electronic controller 410) based on the first keypanel and the remote keypanel. For example, identifiers for the first keypanel and the remote keypanel are used to query a lookup table and return an adjusted trunk gain value matched those identifiers. The first intercom 104 then applies the adjusted trunk gain value to the first crosspoint. As a result, the re-established trunk transmits audio from the first keypanel at the same gain requested by the remote keypanel during the previous trunked call.

In some configurations, more than one trunk line may be used to connect two intercoms. Because the trunk gain values are stored in relation to the first keypanel and the remote keypanel, in some embodiments, the first intercom 104 applies the adjusted trunk gain values to any trunked connection between the first keypanel and the remote keypanel, regardless of which trunk line is used to connect the two.

As described above with respect to FIG. 5, some intercoms employ forking to patch more than one local keypanel to a remote keypanel over the same trunk line. In some embodiments, gains are adjusted for each keypanel at their respective crosspoints.

For example, the first intercom 104 receives, from a second keypanel coupled to a third port of the first intercom 104 (e.g., the second keypanel 116 coupled to input port 5, as illustrated in FIG. 5), a second call request identifying the remote keypanel coupled to the second intercom. In response, the first intercom 104 transmits to the trunk controller a second trunk request based on the second call request. The first intercom 104 receives from the trunk controller a second trunk setup message. The first intercom 104 activates a second crosspoint (e.g., the crosspoint 514 illustrated in FIG. 5) based on the second trunk setup message. The first intercom 104 applies a second trunk gain value to the second crosspoint based on the second keypanel and the remote keypanel. For example, the first intercom 104 may retrieve the second trunk gain value from the memory of the electronic controller 410 using identifiers for the second keypanel and the remote keypanel, as noted above.

In some embodiments, adjusting audio gains for remote assignments may be performed in any one or more of the intercoms that make up the trunked connection between the keypanels. For example, when adjusting the audio level from the first keypanel 114 to the third keypanel 118 as illustrated in FIG. 5, the audio gain can be adjusted in either the first intercom 104 or the second intercom 106 (or even in a combination of them). For example, when the trunk is forked in the first intercom 104 (as illustrated in FIG. 5), the audio gain must be adjusted for the appropriate crosspoint in the first intercom 104. Likewise, if the trunk were forked in the second intercom 106 (not illustrated), the audio gain must be adjusted for the appropriate crosspoint in the second intercom 106. When the trunk is not forked at either end, the gain may be adjusted in either the first intercom 104 or the second intercom 106. In some embodiments, the trunk controller 102 determines where to adjust the gain, and sends messages to the affected intercoms. For example, in response to a request for a −6 dB gain adjustment, the trunk controller 102 may send a message to the first intercom 104 instructing it to apply a −6 dB gain at the appropriate local crosspoint. In another example, the trunk controller 102 may send messages to the first intercom 104 and the second intercom 106 instructing each to apply a −3 dB gain at their respective local crosspoints, resulting in an overall requested path gain of −6 dB.

Figure 7:
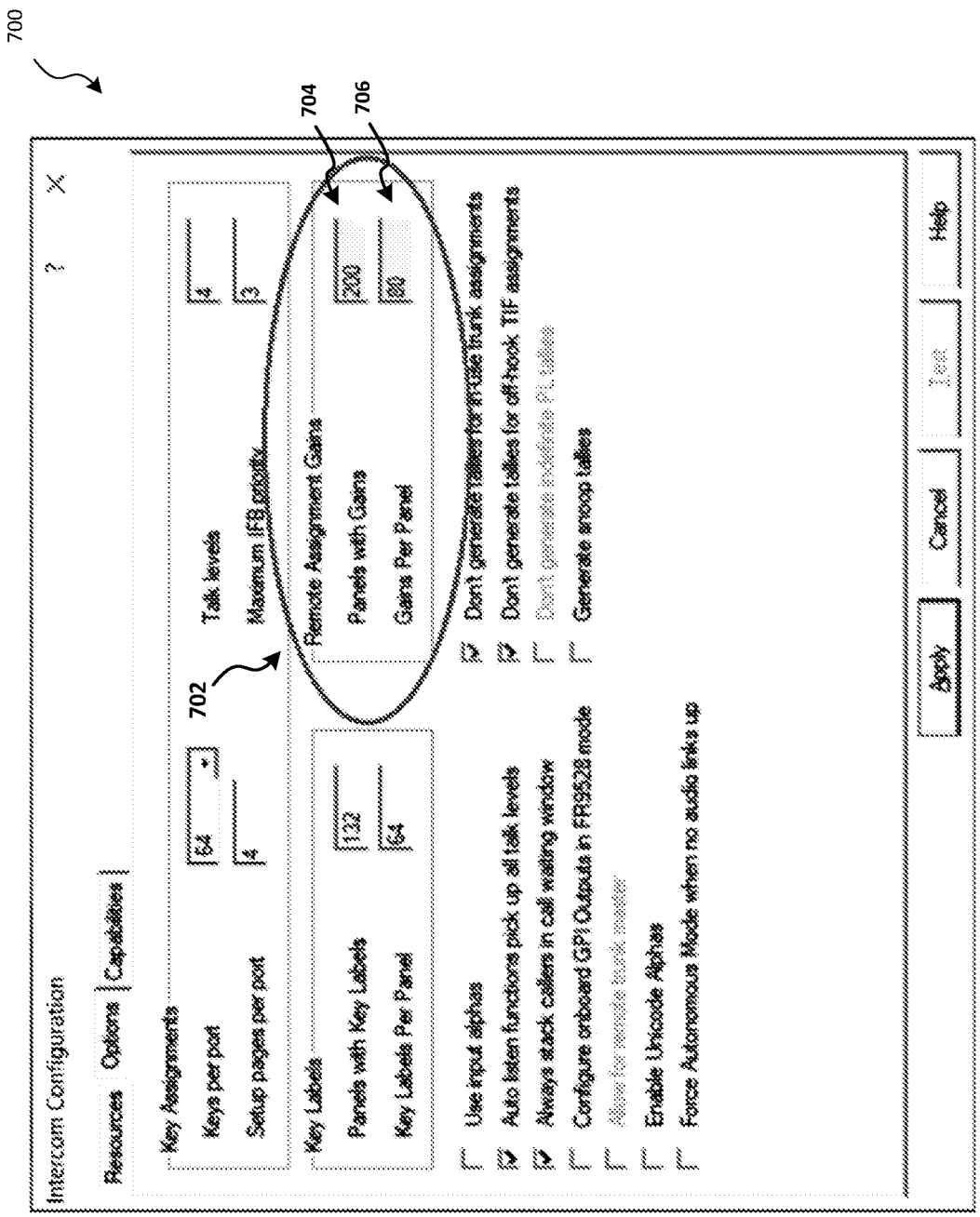
FIG. 7 illustrates an example graphical user interface element, in accordance with some embodiments.

Because of the size of some intercom systems remote gain adjustment capabilities are limited to preserve limited memory resources. FIG. 7 illustrates an example graphical user interface element 700. The element 700 is generated by the intercom editor 110 to allow users to configure, for example, the first intercom 104 and the second intercom 106. A user may specify a maximum panel quantity 704 ("Panels with Gains"), which limits how many ports in the system are allowed to request remote gain adjustment. A user may also specify a maximum gain per panel quantity 706 ("Gains Per Panel"), which limits the number of individual gain values that can be specified by an individual keypanel.

Figure 8:
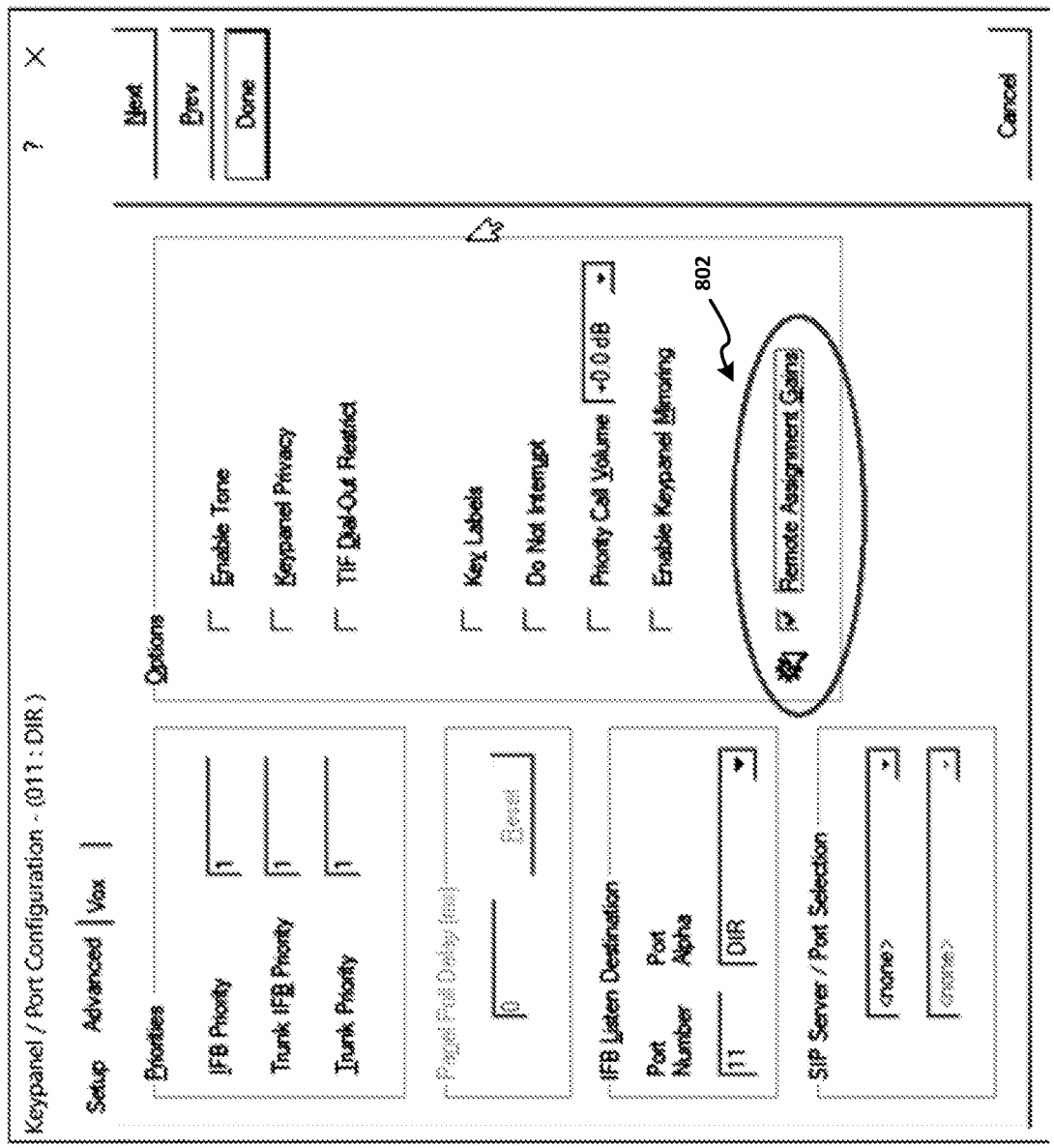
FIG. 8 illustrates an example graphical user interface element, in accordance with some embodiments.

In some embodiments, before remote assignment gains can be adjusted using the method 600, remote gain adjustment must be enabled for the remote keypanel. FIG. 8 illustrates an example graphical user interface element 800. The element 800 is generated by the intercom editor 110 to allow users to configure, for example, the first keypanel 114, the second keypanel 116, and the third keypanel 118. Using checkbox 802, a user can enable remote assignment gains on a keypanel. The number of remote assignment gains are limited, as noted herein with respect to FIG. 7.

When remote assignment gains have been enabled for a keypanel, gains for remote assignments can be adjusted by users. For example, gains can be adjusted for remote assignments just as for local assignments. For example, on a KP-5032 keypanel, a user moves the lever key for the assignment left or right to adjust the gain. In another example, the remote assignment gains can be pre-set using software (e.g., AZedit) on the intercom editor 110.

In some embodiments, intercoms support multiple independent party lines. For example, in digital intercoms, party lines are a resource without any specific hardware such as a physical wire. Multiple users (keypanels) all talk and listen to the same party line, and they will all hear each other because the controller closes the necessary crosspoints. Using party lines, connected keypanels can listen (without talking), talk (without listening), or can talk and listen simultaneously. Using embodiments described herein, a keypanel can adjust the level at which it listens to remote party lines.

One or more embodiments have been described and illustrated in the foregoing specification and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. Moreover, relational terms such as first and second, top and bottom, and the like may be used herein solely to distinguish one entity or action from another entity or action without necessarily requiring or implying any actual such relationship or order between such entities or actions.

Various features and advantages of some embodiments are set forth in the following claims.

What is claimed is:

1. An intercom device comprising:
an electronic processor configured to:
receive a call request identifying a second intercom device;
transmit, to a trunk controller, a trunk request based on the call request;
receive, from the trunk controller, a trunk setup message;
activate a first crosspoint based on the trunk setup message;
apply a trunk gain value to the first crosspoint based on the second intercom device;
transmit, with an audio gain based on the trunk gain value, an audio stream to the second intercom device via the first crosspoint;
receive, from the second intercom device, a gain adjustment value associated with the intercom device and the second intercom device; and
apply an adjusted trunk gain value to the first crosspoint based on the gain adjustment value.

2. The intercom device of claim 1, wherein the electronic processor is further configured to apply the trunk gain value to the first crosspoint based on the trunk setup message.

3. The intercom device of claim 1, further comprising:
a memory;
wherein the electronic processor is coupled to the memory and configured to retrieve the trunk gain value from the memory based on the intercom device and the second intercom device.

4. The intercom device of claim 1, wherein the electronic processor is further configured to transmit the audio stream with an audio gain based on the adjusted trunk gain value.

5. The intercom device of claim 1, further comprising:
a memory;
wherein the electronic processor is coupled to the memory and configured to store, in the memory, the adjusted trunk gain value.

6. The intercom device of claim 5, wherein the electronic processor is further configured to:
responsive to activating the first crosspoint, begin a trunk timer; and
when the trunk timer expires without receiving an audio input:
deactivate the first crosspoint;
receive a second call request identifying the second intercom device;
transmit, to the trunk controller via the communication interface, a second trunk request based on the second call request;
receive, from the trunk controller via the communication interface, a second trunk setup message;
activate the first crosspoint based on the second trunk setup message;
retrieve the adjusted trunk gain value from the memory; and
apply the adjusted trunk gain value to the first crosspoint.

7. The intercom device of claim 1, wherein
the electronic processor is further configured to:
receive a second call request identifying the second intercom device;
transmit, to the trunk controller, a second trunk request based on the second call request;
receive, from the trunk controller, a second trunk setup message;
activate a second crosspoint based on the second trunk setup message; and
apply a second trunk gain value to the second crosspoint.

8. The intercom device of claim 7, further comprising:
a memory;
wherein the electronic processor is coupled to the memory and configured to retrieve the second trunk gain value from the memory based on the remote keypanel.

9. The intercom device of claim 7, wherein the electronic processor is further configured to:
receive, from the second intercom, a second gain adjustment value;
apply a second adjusted trunk gain value to the second crosspoint based on the second gain adjustment value; and
transmit to the second intercom device via the second port an audio stream mixed with a second audio stream;
wherein the audio stream has an audio gain based on the adjusted trunk gain value and the second audio stream has a second audio gain based on the second adjusted trunk gain value.

10. The intercom device of claim 1, further comprising:
a memory;
a second trunk line providing a second two-way audio connection between the intercom device and the second intercom device; and
the electronic processor is coupled to the memory and further configured to:
receive a second call request identifying the second intercom device;
transmit, to the trunk controller, a second trunk request based on the second call request;
receive, from the trunk controller, a second trunk setup message;
activate a second crosspoint based on the second trunk setup message;
retrieve a second trunk gain value from the memory; and
apply the second trunk gain value to the second crosspoint.

11. A method for operating an intercom system, the method comprising:
receiving a call request identifying a second intercom device;
transmitting, to a trunk controller, a trunk request based on the call request;
receiving, from the trunk controller, a trunk setup message;
activating a first crosspoint of a plurality of crosspoints based on the trunk setup message;
applying a trunk gain value to the first crosspoint based on the second intercom device;
transmitting, with an audio gain based on the trunk gain value, an audio stream to the second intercom device via the first crosspoint;
receiving, from the second intercom, a gain adjustment value; and
applying an adjusted trunk gain value to the first crosspoint based on the gain adjustment value.

12. The method of claim 11, wherein applying the trunk gain value to the first crosspoint includes applying the trunk gain value based on the trunk setup message.

13. The method of claim 11, further comprising:
retrieving the trunk gain value from a memory based on the intercom device and the second intercom device.

14. The method of claim 11, further comprising:
transmitting the audio stream with an audio gain based on the adjusted trunk gain value.

15. The method of claim 11, further comprising:
storing in a memory the adjusted trunk gain value.

16. The method of claim 15, further comprising:
responsive to activating the first crosspoint, beginning a trunk timer; and
when the trunk timer expires without receiving an audio input:
deactivating the first crosspoint;
receiving a second call request identifying the second intercom device;
transmitting to the trunk controller a second trunk request based on the second call request;
receiving, from the trunk controller, a second trunk setup message;
activating the first crosspoint based on the second trunk setup message;
retrieving the adjusted trunk gain value from the memory; and
applying the adjusted trunk gain value to the first crosspoint.

17. The method of claim 11, further comprising:
receiving a second call request identifying the second intercom device;
transmitting, to the trunk controller, a second trunk request based on the second call request;
receiving, from the trunk controller, a second trunk setup message;
activating a second crosspoint based on the second trunk setup message; and
applying a second trunk gain value to the second crosspoint.

18. The method of claim 17, further comprising:
retrieving the second trunk gain value from the memory.

19. The method of claim 17, further comprising:
receiving, from the second intercom, a second gain adjustment value;
applying a second adjusted trunk gain value to the second crosspoint based on the second gain adjustment value; and
transmitting to the second intercom device an audio stream mixed with a second audio stream;
wherein the audio stream has an audio gain based on the adjusted trunk gain value and the second audio stream has a second audio gain based on the second adjusted trunk gain value.

* * * * *